(12) United States Patent
Uehara

(10) Patent No.: US 12,209,630 B2
(45) Date of Patent: Jan. 28, 2025

(54) DAMPER DEVICE

(71) Applicant: EXEDY Corporation, Neyagawa (JP)

(72) Inventor: Hiroshi Uehara, Neyagawa (JP)

(73) Assignee: EXEDY Corporation, Osaka (JP)

( * ) Notice: Subject to any disclaimer, the term of this patent is extended or adjusted under 35 U.S.C. 154(b) by 371 days.

(21) Appl. No.: 17/826,544

(22) Filed: May 27, 2022

(65) Prior Publication Data

US 2022/0412410 A1 Dec. 29, 2022

(30) Foreign Application Priority Data

Jun. 28, 2021 (JP) ................. 2021-106702

(51) Int. Cl.
  *F16D 7/02* (2006.01)
  *F16D 3/12* (2006.01)
  *F16F 15/129* (2006.01)
  *F16F 15/123* (2006.01)

(52) U.S. Cl.
  CPC ............. *F16D 7/025* (2013.01); *F16D 3/12* (2013.01); *F16F 15/1297* (2013.01); *F16F 15/12353* (2013.01); *F16F 2232/02* (2013.01); *F16F 2236/08* (2013.01)

(58) Field of Classification Search
  CPC ........ F16D 7/025; F16D 3/12; F16F 15/1297; F16F 15/12353; F16F 2232/02; F16F 2236/08
  USPC ........................................... 464/45, 46, 68.1
  See application file for complete search history.

(56) References Cited

U.S. PATENT DOCUMENTS

| 9,127,720 | B2 * | 9/2015 | Saeki ................. F16F 15/1297 |
| 11,268,578 | B2 * | 3/2022 | Theriot ............... F16F 15/1297 |
| 2012/0142437 | A1 | 6/2012 | Doman et al. |
| 2021/0102599 | A1 | 4/2021 | Uehara et al. |

FOREIGN PATENT DOCUMENTS

| JP | 2011047470 A | 3/2011 |
| JP | 2011-226572 A | 11/2011 |
| JP | 2021055811 A | 4/2021 |

* cited by examiner

*Primary Examiner* — Greg Binda
(74) *Attorney, Agent, or Firm* — United IP Counselors, LLC

(57) ABSTRACT

A damper device includes a damper unit and a torque limiter unit. The damper unit includes an output plate, an elastic member, first and second input plates. The torque limiter unit includes a pressure plate, first and second side plates. The first side plate has an inner diameter equal to an outer diameter of the output plate. The second side plate has an inner diameter equal to an outer diameter of the first input plate. The pressure plate has an inner diameter equal to an outer diameter of the second input plate. An inner-peripheral surface of the first side plate is not opposed to an outer-peripheral surface of the output plate. An inner-peripheral surface of the second side plate is not opposed to an outer-peripheral surface of the first input plate. An inner-peripheral surface of the pressure plate is not opposed to an outer-peripheral surface of the second input plate.

9 Claims, 9 Drawing Sheets

DAMPER DEVICE

CROSS-REFERENCE TO RELATED APPLICATIONS

This application claims priority to Japanese Patent Application No. 2021-106702 filed Jun. 28, 2021. The entire contents of that application are incorporated by reference herein in their entirety.

TECHNICAL FIELD

The present invention relates to a damper device.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 includes a damper unit and a torque limiter unit disposed radially outside the damper unit. The damper unit includes a side plate, a drive plate, and a hub plate. The torque limiter unit includes a cover plate, a friction plate, and a pressure plate.

It has been demanded to obtain, at low cost, the damper device configured as described above to include the damper unit and the torque limiter unit.

It is an object of the present invention to provide a damper device obtainable at low cost.

BRIEF SUMMARY

A damper device according to a first aspect of the present invention includes a damper unit and a torque limiter unit. The damper unit includes an output plate, a first input plate, a second input plate, and an elastic member. The second input plate is unitarily rotated with the first input plate. The elastic member elastically connects the output plate and the first and second input plates. The torque limiter unit is disposed radially outside the damper unit. The torque limiter unit includes a first side plate, a second side plate, and a pressure plate. The first side plate has an annular shape. The first side plate has an inner diameter equal to an outer diameter of the output plate. The second side plate has an annular shape. The second side plate has an inner diameter equal to an outer diameter of the first input plate. The second side plate is unitarily rotated with the first side plate. The pressure plate has an annular shape. The pressure plate has an inner diameter equal to an outer diameter of the second input plate. The pressure plate is disposed axially between the first side plate and the second side plate. The first side plate is disposed such that an inner peripheral surface thereof is not opposed to an outer peripheral surface of the output plate. The second side plate is disposed such that an inner peripheral surface thereof is not opposed to an outer peripheral surface of the first input plate. The pressure plate is disposed such that an inner peripheral surface thereof is not opposed to an outer peripheral surface of the second input plate.

According to the configuration described above, the first side plate and the output plate are disposed such that the inner peripheral surface of the first side plate is not opposed to the outer peripheral surface of the output plate. In other words, the first side plate and the output plate are disposed not to interfere with each other. Because of this, the inner diameter of the first side plate and the outer diameter of the output plate can be made equal. As a result, when the first side plate and the output plate are configured to be taken out from a single member, a surplus part is not formed radially between the first side plate and the output plate. Likewise, when the second side plate and the first input plate are configured to be taken out from another single member, a surplus part can be also eliminated radially therebetween. Still likewise, when the pressure plate and the second input plate are configured to be taken out from yet another single member, a surplus part can be also eliminated radially therebetween. As described above, the damper device can be obtained at low cost by eliminating the surplus parts, i.e., reduction in material cost.

Preferably, the inner diameter of the pressure plate is greater than the outer diameter of the output plate. According to the configuration, the pressure plate and the output plate can be overlapped in a radial view. As a result, the damper device can be made compact in the axial direction.

Preferably, the inner peripheral surface of the pressure plate is opposed to the outer peripheral surface of the output plate.

Preferably, the output plate is equal in plate thickness to the first side plate.

Preferably, the first input plate is equal in plate thickness to the second side plate.

Preferably, the second input plate is equal in plate thickness to the pressure plate.

A damper device according to a second aspect of the present invention includes a damper unit and a torque limiter unit. The damper unit includes an output plate, a first input plate, a second input plate, and an elastic member. The second input plate is unitarily rotated with the first input plate. The elastic member elastically connects the output plate and the first and second input plates. The torque limiter unit is disposed radially outside the damper unit. The torque limiter unit includes a first side plate, a second side plate, and a pressure plate. The first side plate has an annular shape. The first side plate has an inner diameter equal to an outer diameter of the output plate. The second side plate has an annular shape. The second side plate is unitarily rotated with the first side plate. The pressure plate has an annular shape. The pressure plate is disposed axially between the first side plate and the second side plate. The first side plate is disposed such that an inner peripheral surface thereof is not opposed to an outer peripheral surface of the output plate.

According to the configuration described above, the first side plate and the output plate are disposed such that the inner peripheral surface of the first side plate is not opposed to the outer peripheral surface of the output plate. In other words, the first side plate and the output plate do not interfere with each other. Because of this, the inner diameter of the first side plate and the outer diameter of the output plate can be made equal. As a result, when the first side plate and the output plate are configured to be taken out from a single member, a surplus part is not formed radially between the first side plate and the output plate. Thus, the damper device can be obtained at low cost by eliminating the surplus part.

A damper device according to a third aspect of the present invention includes a damper unit and a torque limiter unit. The damper unit includes an output plate, a first input plate, a second input plate, and an elastic member. The second input plate is unitarily rotated with the first input plate. The elastic member elastically connects the output plate and the first and second input plates. The torque limiter unit is disposed radially outside the damper unit. The torque limiter unit includes a first side plate, a second side plate, and a pressure plate. The first side plate has an annular shape. The second side plate has an annular shape. The second side plate has an inner diameter equal to an outer diameter of the first input plate. The second side plate is unitarily rotated with the first side plate. The pressure plate has an annular shape. The pressure plate is disposed axially between the first side plate and the second side plate. The second side plate is disposed such that an inner peripheral surface thereof is not opposed to an outer peripheral surface of the first input plate.

According to the configuration described above, the second side plate and the first input plate are disposed such that the inner peripheral surface of the second side plate is not opposed to the outer peripheral surface of the first input plate. In other words, the second side plate and the first input plate do not interfere with each other. Because of this, the inner diameter of the second side plate and the outer diameter of the first input plate can be made equal. As a result, when the second side plate and the first input plate are configured to be taken out from a single member, a surplus part is not formed radially between the second side plate and the first input plate. Thus, the damper device can be obtained at low cost by eliminating the surplus part.

A damper device according to a fourth aspect of the present invention includes a damper unit and a torque limiter unit. The damper unit includes an output plate, a first input plate, a second input plate, and an elastic member. The second input plate is unitarily rotated with the first input plate. The elastic member elastically connects the output plate and the first and second input plates. The torque limiter unit is disposed radially outside the damper unit. The torque limiter unit includes a first side plate, a second side plate, and a pressure plate. The first side plate has an annular shape. The second side plate has an annular shape. The second side plate is unitarily rotated with the first side plate. The pressure plate has an annular shape. The pressure plate has an inner diameter equal to an outer diameter of the second input plate. The pressure plate is disposed axially between the first side plate and the second side plate. The pressure plate is disposed such that an inner peripheral surface thereof is not opposed to an outer peripheral surface of the second input plate.

According to the configuration described above, the pressure plate and the second input plate are disposed such that the inner peripheral surface of the pressure plate is not opposed to the outer peripheral surface of the second input plate. In other words, the pressure plate and the second input plate do not interfere with each other. Because of this, the inner diameter of the pressure plate and the outer diameter of the second input plate can be made equal. As a result, when the pressure plate and the second input plate are configured to be taken out from a single member, a surplus part is not formed radially between the pressure plate and the second input plate. Thus, the damper device can be obtained at low cost by eliminating the surplus part.

Overall, according to the present invention, it is possible to provide a damper device obtainable at low cost.

DETAILED DESCRIPTION

[Entire Configuration]

Figure 1:
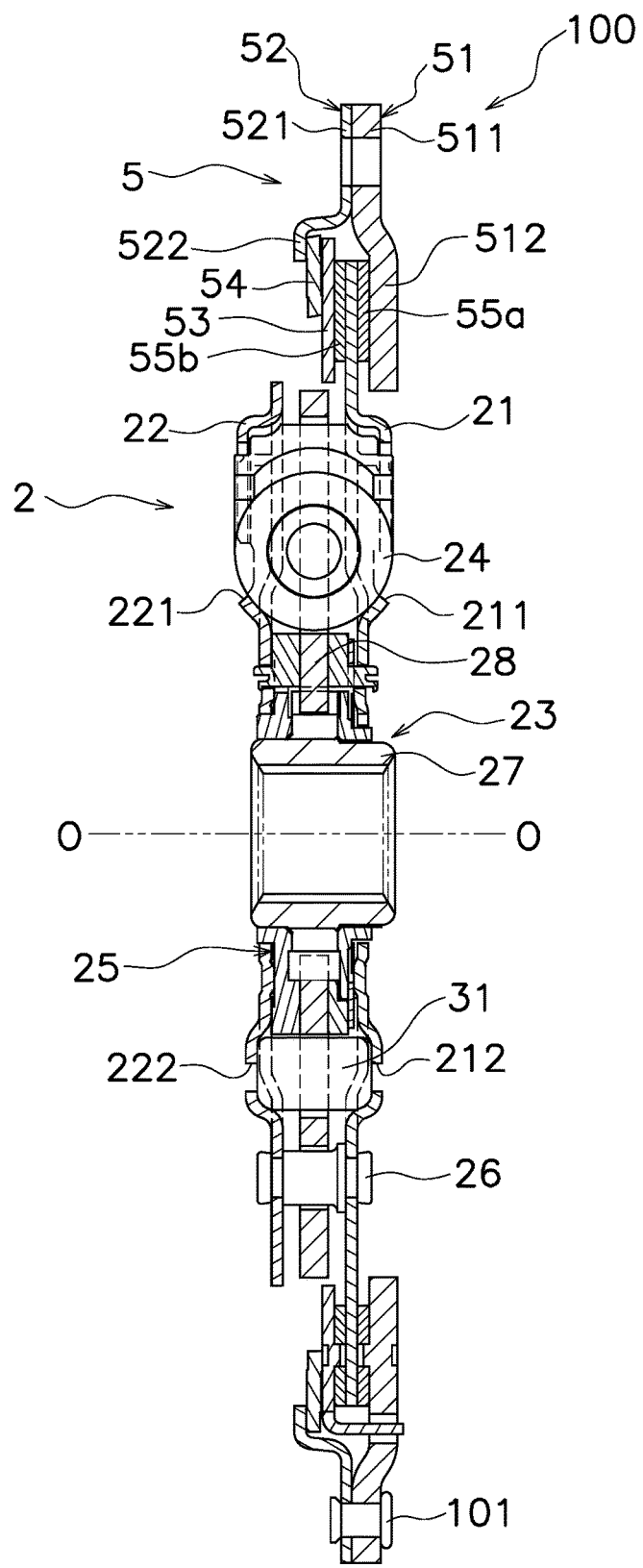
FIG. 1 is a cross-sectional view of a damper device.
Figure 2:
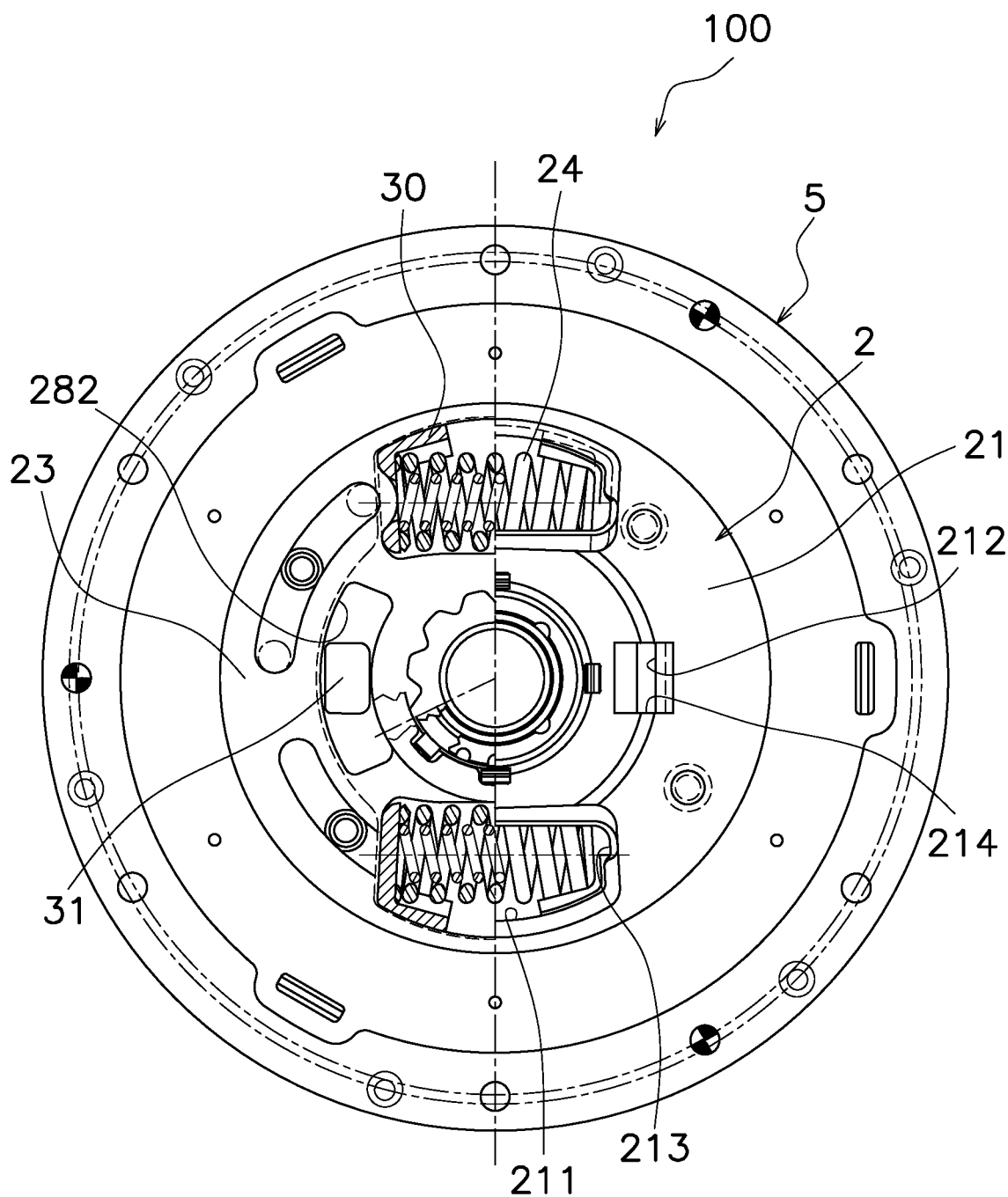
FIG. 2 is a front view of the damper device.

FIG. 1 is a cross-sectional view of a damper device 100 according to the present preferred embodiment. On the other hand, FIG. 2 is a front view of the damper device 100 in a condition that some constituent members are detached therefrom or are not illustrated in part. In FIG. 1, line O-O indicates a rotational axis of the damper device 100. In FIG. 1, an engine is disposed on the right side of the damper device 100, whereas a drive unit, including an electric motor, a transmission, and so forth, is disposed on the left side of the damper device 100.

It should be noted that in the following explanation, the term "axial direction" refers to an extending direction of the rotational axis O of the damper device 100. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with the circumferential direction of the imaginary circle about the rotational axis O; likewise, the radial direction is not required to be perfectly matched with a diameter direction of the imaginary circle about the rotational axis O.

As shown in FIGS. 1 and 2, the damper device 100 is provided between a flywheel and an input shaft of the drive unit (both of which are not shown in the drawings). Besides, the damper device 100 is configured to limit a torque transmitted between the engine and the drive unit, and simultaneously, attenuate rotational fluctuations. The damper device 100 includes a damper unit 2 and a torque limiter unit 5.

[Damper Unit]

The damper unit 2 includes a first input plate 21, a second input plate 22, a hub flange 23, and a plurality of elastic members 24. Besides, the damper unit 2 includes a hysteresis generating mechanism 25. The damper unit 2 is configured to attenuate rotational fluctuations.

<First and Second Input Plates>

Each of the first and second input plates 21 and 22 is an annular member having a center hole. The outer diameter of the first input plate 21 is greater than that of the second input plate 22. The first input plate 21 is interposed at the outer peripheral end thereof between a first side plate 51 and a pressure plate 53. When described in detail, the first input plate 21 is interposed at the outer peripheral end thereof between a first friction member 55a fixed to the first side plate 51 and a second friction member 55b fixed to the pressure plate 53.

The first and second input plates 21 and 22 are disposed apart from each other at an interval in the axial direction. The first and second input plates 21 and 22 are fixed to each other by a plurality of stop pins 26. Therefore, the first and second input plates 21 and 22 are unitarily rotated with each other. Besides, the first and second input plates 21 and 22 are immovable relative to each other in the axial direction.

The first input plate 21 includes a plurality of first window portions 211 and a plurality of second window portions 212. It should be noted that in the present preferred embodiment, the first input plate 21 includes a pair of first window portions 211 and a pair of second window portions 212.

The pair of first window portions 211 is disposed such that a phase difference therebetween can be 180 degrees about the rotational axis O. In other words, the pair of first window portions 211 is disposed to be point symmetric about the rotational axis O. Each first window portion 211 is formed by cutting and raising the first input plate 21. Because of this, each first window portion 211 includes support portions on the outer and inner peripheral edges thereof, respectively. Each first window portion 211 includes a pair of pressing surfaces 213 on both circumferential end surfaces thereof.

The pair of second window portions 212 is disposed such that a phase difference therebetween can be 180 degrees about the rotational axis O. In other words, the pair of second window portions 212 is disposed to be point symmetric about the rotational axis O. Besides, the pair of second window portions 212 is disposed such that a phase difference relative to the pair of first window portions 211 can be 90 degrees about the rotational axis O. Each second window portion 212 is a rectangular opening axially penetrating the first input plate 21. Each second window portion 212 includes a pair of pressing surfaces 214 on both circumferential end surfaces thereof. Besides, each second window portion 212 includes support portions on the outer and inner peripheral edges thereof, respectively.

The second input plate 22 includes a plurality of third window portions 221 and a plurality of fourth window portions 222. It should be noted that in the present preferred embodiment, the second input plate 22 includes a pair of third window portions 221 and a pair of fourth window portions 222. Each third window portion 221 is configured in similar manner to each first window portion 211 described above, whereas each fourth window portion 222 is configured in similar manner to each second window portion 212 described above.

In an axial view, the third window portions 221 are disposed to overlap the first window portions 211, respectively. Likewise in the axial view, the fourth window portions 222 are disposed to overlap the second window portions 212, respectively.

<Hub Flange>

The hub flange 23 is configured to transmit a torque, inputted thereto from the first and second input plates 21 and 22 to an output-side device. The hub flange 23 includes a hub 27 and a flange plate 28 (exemplary output plate). As shown in FIG. 2, the hub 27 and the flange plate 28 are integrated by a plurality of teeth and a plurality of recesses with which the plural teeth are meshed.

The hub 27 is a tubular member disposed within the center holes of the first and second input plates 21 and 22. The hub 27 is provided with a spline hole axially extending in the inner peripheral part thereof. The spline hole enables an output-side member to be spline-coupled thereto.

The flange plate 28 is disposed axially between the first and second input plates 21 and 22.

Figure 3:
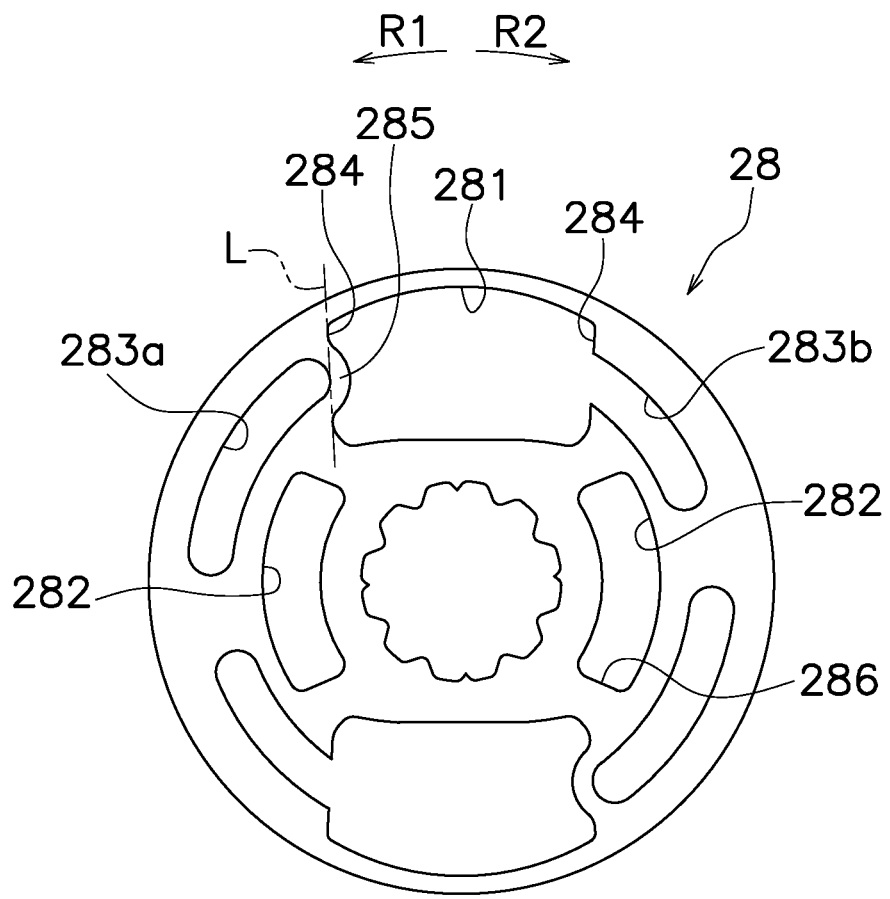
FIG. 3 is a front view of a flange plate.

FIG. 3 is a front view of the flange plate 28. As shown in FIGS. 2 and 3, the flange plate 28 is made in shape of a disc. The flange plate 28 includes a center hole, a pair of first accommodation holes 281, a pair of second accommodation holes 282, a pair of first stopper holes 283a, and a pair of second stopper holes 283b.

The pair of first accommodation holes 281 is disposed such that a phase difference therebetween can be 180 degrees about the rotational axis O. In other words, the pair of first accommodation holes 281 is disposed to be point symmetric about the rotational axis O. In the axial view, the first accommodation holes 281 are disposed to overlap the first window portions 211 and the third window portions 221, respectively. Each first accommodation hole 281 includes a pair of pressing surfaces 284 on both circumferential end surfaces thereof.

Each first accommodation hole 281 includes a protruding portion 285 on R1-side one of the pair of pressing surfaces 284. The protruding portion 285 is provided in a radially center part of the R1-side pressing surface 284. The protruding portion 285 protrudes to bulge toward R2-side one of the pair of pressing surfaces 284.

The pair of second accommodation holes 282 is disposed such that a phase difference therebetween can be 180 degrees about the rotational axis O. In other words, the pair of second accommodation holes 282 is disposed to be point symmetric about the rotational axis O. In the axial view, the second accommodation holes 282 are disposed to overlap the second window portions 212 and the fourth window portions 222, respectively.

Each second accommodation hole 282 is made in shape of a circular arc. The second accommodation holes 282 are disposed radially inside the first accommodation holes 281. Each second accommodation hole 282 includes a pair of pressing surfaces 286 on both circumferential end surfaces thereof. The distance between the pressing surfaces 286 is set to be longer than that between the pressing surfaces 214 of each second window portion 212 provided in the first input plate 21.

Each first stopper hole 283a is circumferentially disposed on the R1 side of the first accommodation hole 281 adjacent thereto. Each first stopper hole 283a is an elongated hole extending in a circular-arc shape. Each first stopper hole 283a is disposed, at the R1-side end thereof, radially outside the second accommodation hole 282 near thereto. Each first stopper hole 283a extends at the R2-side end thereof toward the protruding portion 285 of the first accommodation hole 281 adjacent thereto. Specifically, each first stopper hole 283a reaches a line segment L at the R2-side end thereof. The line segment L is herein defined as an imaginary line segment connecting parts (not provided with the protruding portion 285) of one pressing surface 284 of each first accommodation hole 281.

Each second stopper hole 283b is circumferentially disposed on the R2 side of the first accommodation hole 281 adjacent thereto. Each second stopper hole 283b is an elongated hole extending in a circular-arc shape. Each second stopper hole 283b is disposed, at the R2-side end thereof, radially outside the second accommodation hole 282 near thereto. Each second stopper hole 283b is communicated at the R1-side end thereof with the first accommodation hole 281 adjacent thereto.

The first and second stopper holes 283a and 283b are axially penetrated by the stop pins 26, respectively. Because of this, the first and second input plates 21 and 22 and the flange plate 28 are rotatable relative to each other within a range that each stop pin 26 is movable within each first/second stopper hole 283a, 283b. In other words, the stop pins 26 and the first and second stopper holes 283a and 283b compose a stopper mechanism. The first and second input plates 21 and 22 and the hub flange 23 are prevented from rotating relative to each other when each stop pin 26 contacts one end surface of each first/second stopper hole 283a, 283b.

<Elastic Members>

As shown in FIGS. 1 and 2, the elastic members 24 are configured to elastically couple the first and second input plates 21 and 22 and the flange plate 28 in a rotational direction. The elastic members 24 are, for instance, coil springs.

The elastic members 24 are accommodated in the first accommodation holes 281 of the flange plate 28, respectively. Besides, the elastic members 24 are accommodated in the first window portions 211 of the first input plate 21, respectively, while being accommodated in the third window portions 221 of the second input plate 22, respectively. It should be noted that each elastic member 24 is axially and radially supported by the support portions of each first/third window portion 211, 221.

Each elastic member 24 is supported by the pressing surfaces 284 through a pair of spring seats 30. The spring seats 30 are disposed on both circumferential ends of each first accommodation hole 281 of the flange plate 28. The spring seats 30 support the end surfaces of each elastic member 24. Besides, the spring seats 30 support the ends of each elastic member 24 from radially outside.

<Resin Members>

Resin members 31 are accommodated in the second accommodation holes 282 of the flange plate 28, respectively. Besides, each resin member 31 is supported by the support portions of each window portion 212, 222 of each first/second input plate 21, 22.

It should be noted that each resin member 31 is disposed in each window portion 212, 222 of each first/second input plate 21, 22 without any circumferential gap. On the other hand, the circumferential length of each resin member 31 is less than that of each second accommodation hole 282 of the flange plate 28.

[Torque Limiter Unit 5]

The torque limiter unit 5 is disposed radially outside the damper unit 2. The torque limiter unit 5 is configured to limit a torque transmitted between the flywheel and the damper unit 2.

The torque limiter unit 5 includes the first side plate 51, a second side plate 52, the pressure plate 53, a cone spring 54, the first friction member 55a, and the second friction member 55b.

<First Side Plate>

The first side plate 51 has an annular shape. The first side plate 51 includes an outer peripheral portion 511 and an inner peripheral portion 512. The first side plate 51 receives an urging force applied by the cone spring 54 at the inner peripheral portion 512 thereof.

The first side plate 51 is provided with the first friction member 55a fixed to the inner peripheral portion 512 thereof. The first friction member 55a is disposed axially between the first side plate 51 and the first input plate 21. The first friction member 55a is engaged by friction with the first input plate 21. When a torque having a predetermined value or greater is inputted, the first side plate 51 and the first input plate 21 are rotated relative to each other, while the first friction member 55a is slid against the first input plate 21. It should be noted that the first friction member 55a may be engaged by friction with the first side plate 51, while being fixed to the first input plate 21.

The first side plate 51 is disposed such that the inner peripheral surface thereof is not opposed to the outer peripheral surface of the flange plate 28. Because of this, the first side plate 51 and the flange plate 28 do not interfere with each other. It should be noted that the term "inner peripheral surface" refers to a surface facing radially inward, whereas the term "outer peripheral surface" refers to a surface facing radially outward.

Figure 4:
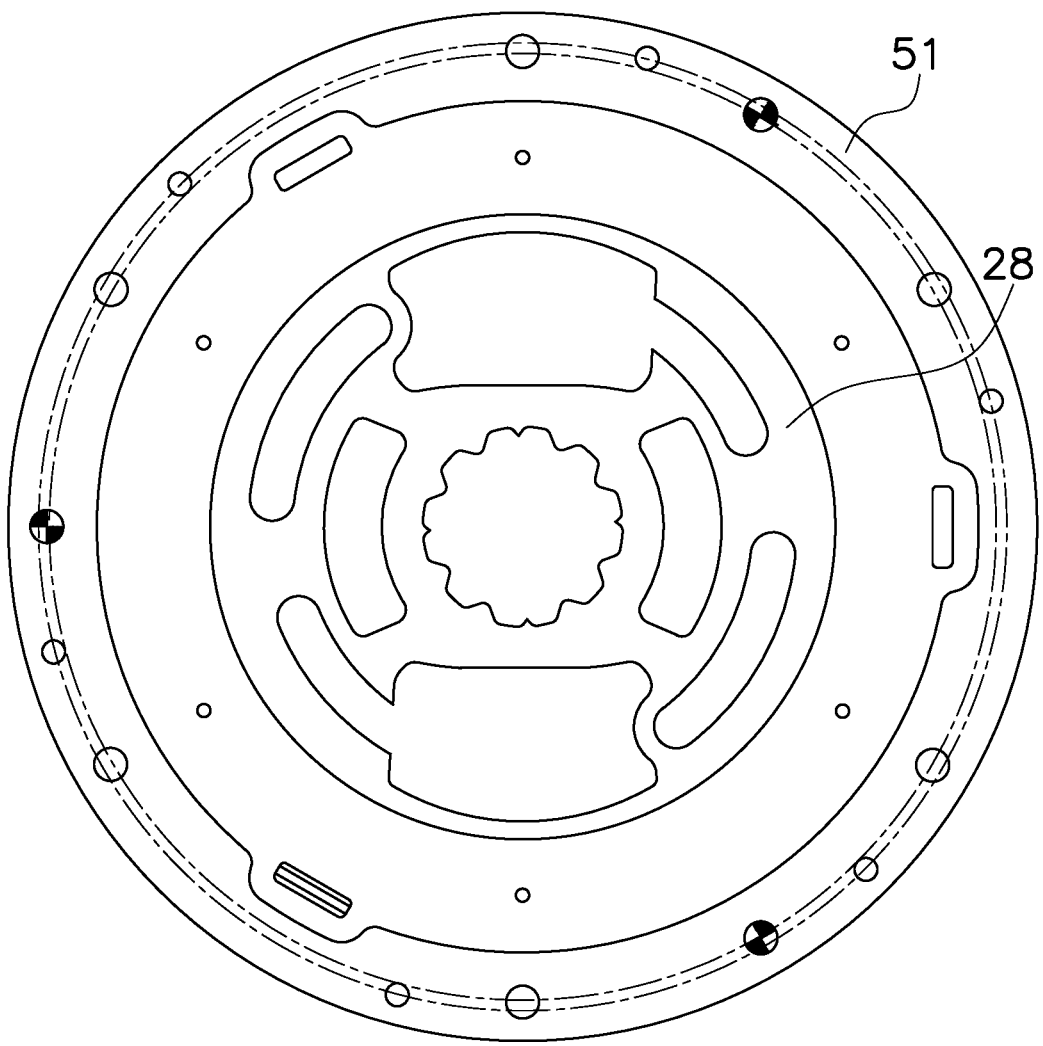
FIG. 4 is a front view of a single plate provided with the flange plate and a first side plate.
Figure 5:
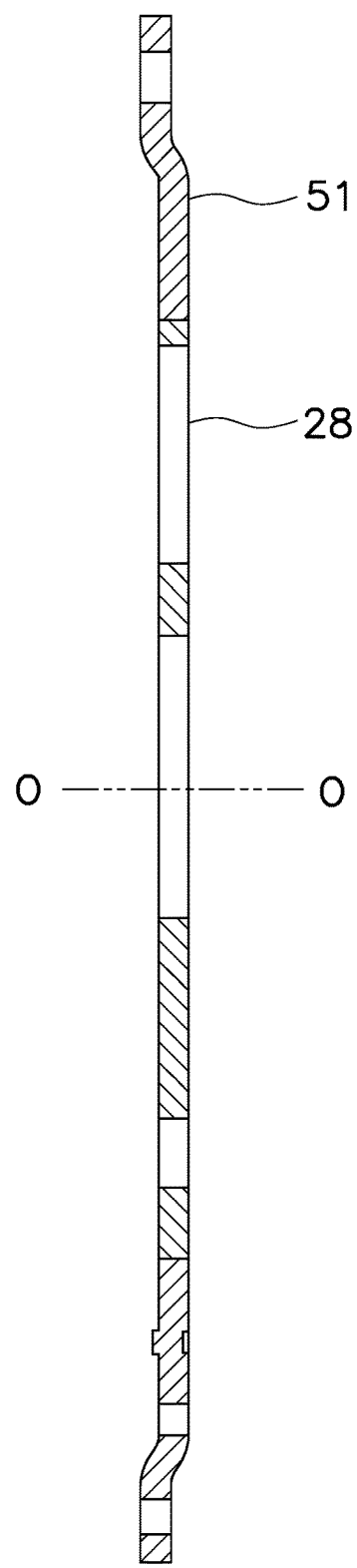
FIG. 5 is a cross-sectional view of the single plate provided with the flange plate and the first side plate.
Figure 6:
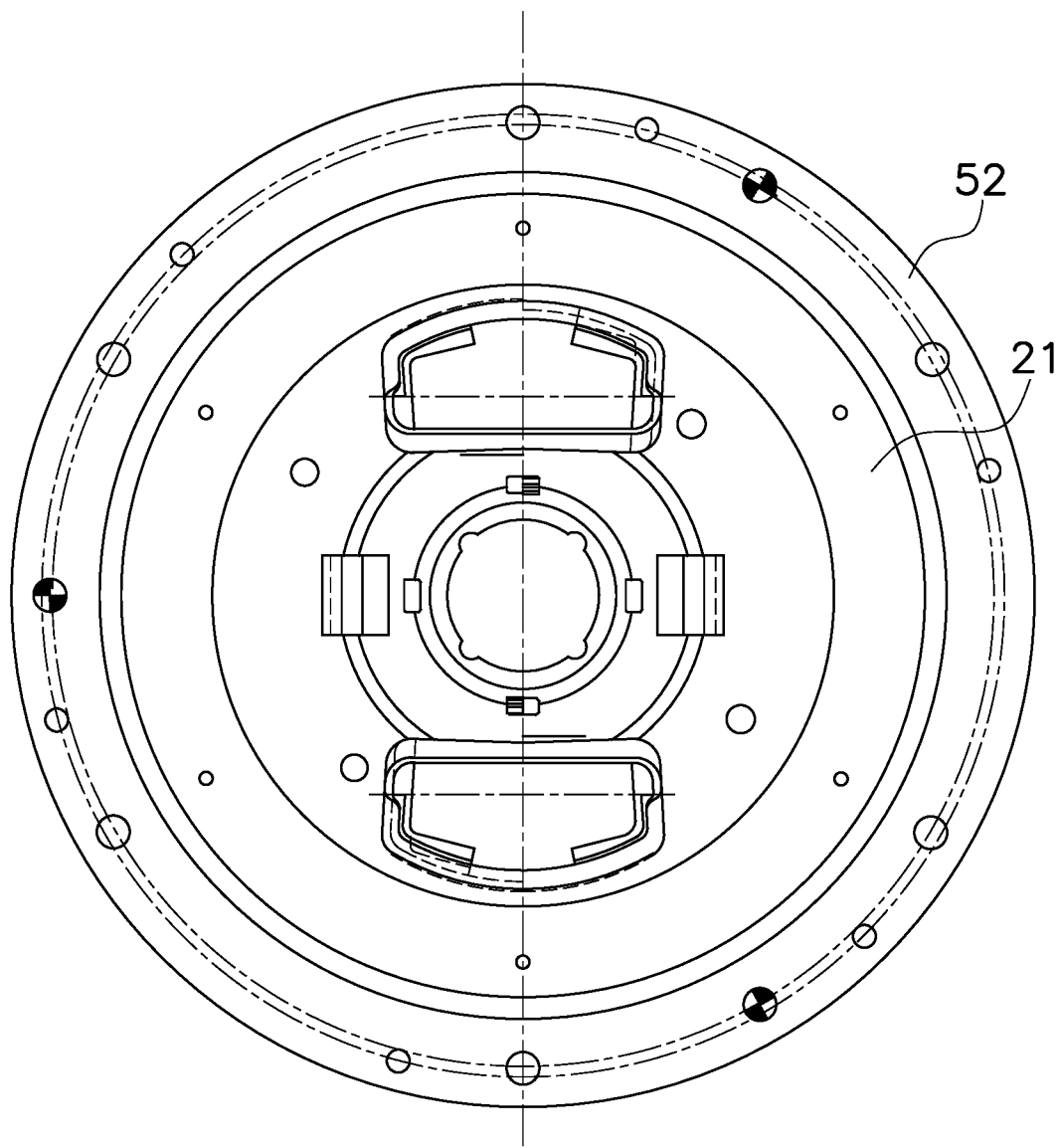
FIG. 6 is a front view of a single plate provided with a first input plate and a second side plate.

The inner diameter of the first side plate 51 is equal to the outer diameter of the flange plate 28. Besides, the plate thickness of the first side plate 51 is equal to that of the flange plate 28. These configurations make it possible to take out the first side plate 51 and the flange plate 28 from a single plate as shown in FIGS. 4 and 5. Besides, there is no gap radially between the first side plate 51 and the flange plate 28. In other words, no unnecessary part is produced radially therebetween. Hence, this can contribute to cost reduction. It should be noted that FIG. 4 is a front view of both the first side plate 51 and the flange plate 28 not separated from each other, whereas FIG. 6 is a cross-sectional view thereof <Second Side Plate>

As shown in FIG. 1, the second side plate 52 is fixed to the first side plate 51 by rivets 101 or so forth. Because of this, the second side plate 52 is unitarily rotated with the first side plate 51.

The second side plate 52 has an annular shape. The second side plate 52 is disposed such that the inner peripheral surface thereof is not opposed to the outer peripheral surface of the first input plate 21. Because of this, the second side plate 52 and the first input plate 21 do not interfere with each other.

The outer diameter of the second side plate 52 is approximately equal to that of the first side plate 51. The inner diameter of the second side plate 52 is greater than that of the first side plate 51. The second side plate 52 makes contacts at an outer peripheral portion 521 thereof with the outer peripheral portion 511 of the first side plate 51. On the other hand, the second side plate 52 is disposed, at an inner peripheral portion 522 thereof, axially apart from the first side plate 51 at an interval. The plate thickness of the second side plate 52 is less than that of the first side plate 51.

Figure 7:
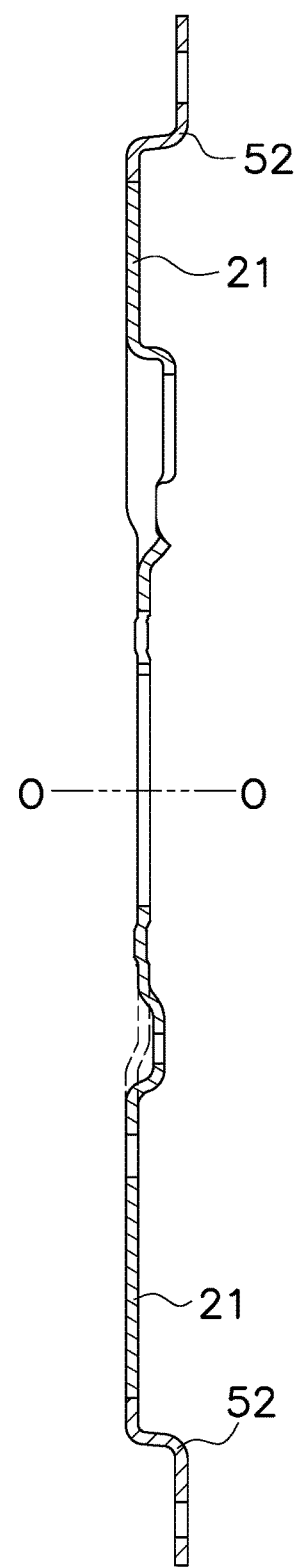
FIG. 7 is a cross-sectional view of the single plate provided with the first input plate and the second side plate.

The inner diameter of the second side plate 52 is equal to the outer diameter of the first input plate 21. Besides, the plate thickness of the second side plate 52 is equal to that of the first input plate 21. These configurations make it possible to take out the second side plate 52 and the first input plate 21 from a single plate as shown in FIGS. 6 and 7. Besides, there is no gap radially between the second side plate 52 and the first input plate 21. In other words, no unnecessary part is produced radially therebetween. Hence, this can contribute to cost reduction. It should be noted that FIG. 6 is a front view of both the second side plate 52 and the first input plate 21 not separated from each other, whereas FIG. 7 is a cross-sectional view thereof <Pressure Plate>

As shown in FIG. 1, the pressure plate 53 has an annular shape. The pressure plate 53 is disposed axially between the first and second side plates 51 and 52. The pressure plate 53 is provided with the second friction member 55b fixed thereto. The second friction member 55b is disposed axially between the pressure plate 53 and the first input plate 21. The second friction member 55b is engaged by friction with the first input plate 21. When a torque having a predetermined value or greater is inputted, the pressure plate 53 and the first input plate 21 are rotated relative to each other, while the second friction member 55b is slid against the first input plate 21. It should be noted that the second friction member 55b may be engaged by friction with the pressure plate 53, while being fixed to the first input plate 21.

The pressure plate 53 is disposed such that the inner peripheral surface thereof is not opposed to the outer peripheral surface of the second input plate 22. Because of this, the pressure plate 53 and the second input plate 22 do not interfere with each other.

The pressure plate 53 has an annular shape. The outer diameter of the pressure plate 53 is less than that of the first side plate 51. The inner diameter of the pressure plate 53 is greater than that of the first side plate 51. Besides, the inner diameter of the pressure plate 53 is less than that of the second side plate 52. The plate thickness of the pressure plate 53 is less than that of the first side plate 51.

Figure 8:
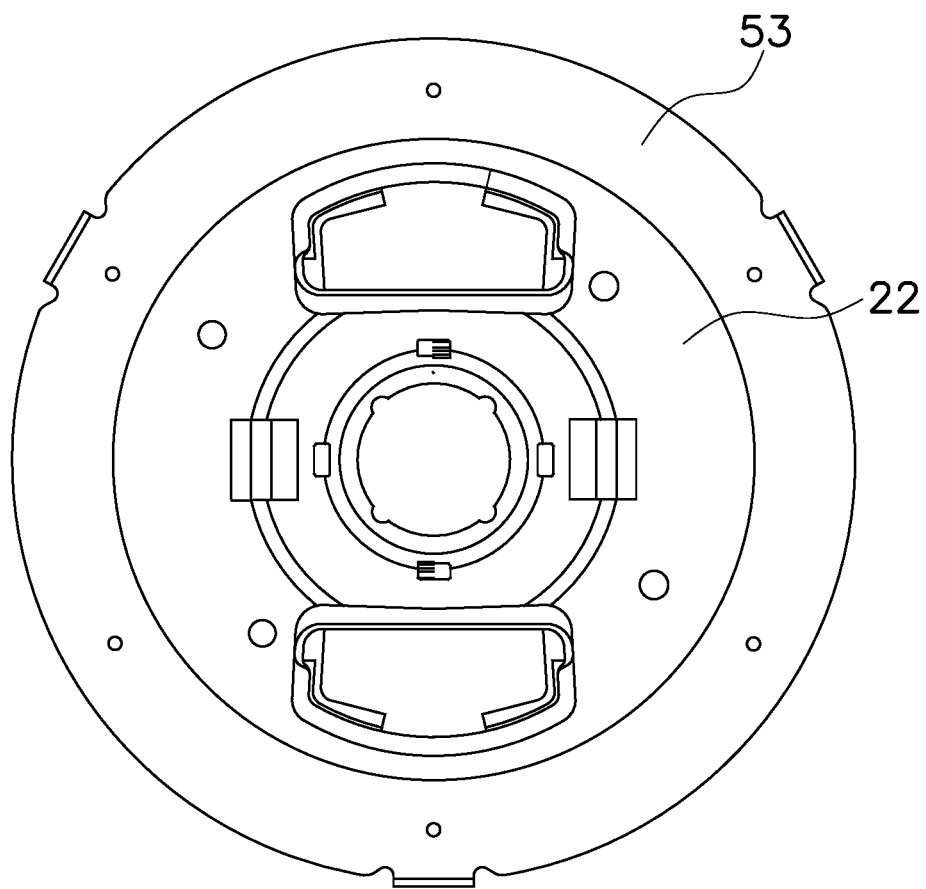
FIG. 8 is a front view of a single plate provided with a second input plate and a pressure plate.
Figure 9:
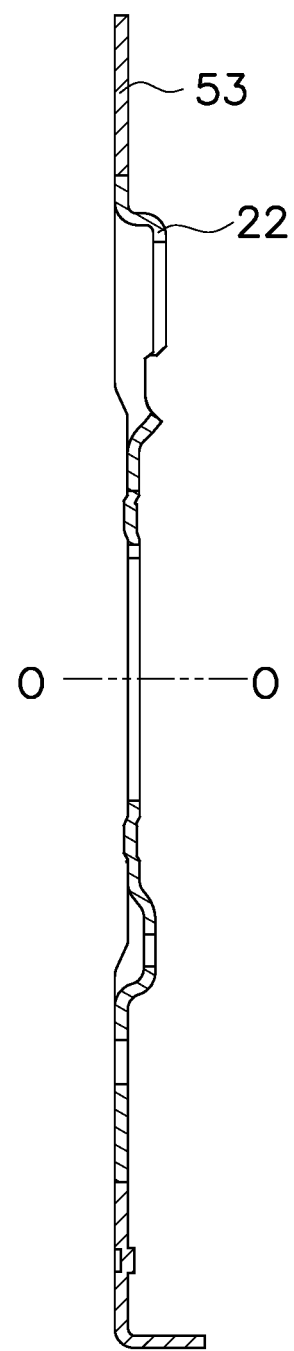
FIG. 9 is a cross-sectional view of the single plate provided with the second input plate and the pressure plate.

The inner diameter of the pressure plate 53 is equal to the outer diameter of the second input plate 22. Besides, the plate thickness of the pressure plate 53 is equal to that of the second input plate 22. These configurations make it possible to take out the pressure plate 53 and the second input plate 22 from a single plate as shown in FIGS. 8 and 9. Besides, there is no gap radially between the pressure plate 53 and the second input plate 22. In other words, no unnecessary part is produced radially therebetween. Hence, this can contribute to cost reduction. It should be noted that FIG. 8 is a front view of both the pressure plate 53 and the second input plate 22 not separated from each other, whereas FIG. 9 is a cross-sectional view thereof.

As shown in FIG. 1, in a radial view, the pressure plate 53 and the flange plate 28 overlap each other at least in part. The inner peripheral surface of the pressure plate 53 is opposed to the outer peripheral surface of the flange plate 28. Besides, the inner diameter of the pressure plate 53 is greater than the outer diameter of the flange plate 28. Because of this, a gap is produced radially between the inner peripheral surface of the pressure plate 53 and the outer peripheral surface of the flange plate 28.

The cone spring 54 is disposed axially between the second side plate 52 and the pressure plate 53. The cone spring 54 urges the pressure plate 53 toward the first side plate 51. The cone spring 54 presses the second friction member 55b toward the first input plate 21 through the pressure plate 53.

The cone spring 54 makes contact at the outer peripheral end thereof with the inner peripheral portion 522 of the second side plate 52. The cone spring 54 makes contact at the inner peripheral end thereof with the pressure plate 53.

[Action]

A torque, transmitted from the engine to the flywheel, is inputted to the damper unit 2 through the torque limiter unit 5. In the damper unit 2, the torque is inputted to the first and second input plates 21 and 22 and is then transmitted to the hub flange 23 through the elastic members 24 and the resin members 31. Subsequently, mechanical power is transmitted from the hub flange 23 to the electric motor, the transmission, a power generator, and so forth that are disposed on the output side.

Incidentally, for instance in starting the engine, chances are that an excessive torque is transmitted from the output side to the engine because the amount of inertia is large on the output side. In such a case, the magnitude of torque to be transmitted to the engine side is limited to a predetermined value or less by the torque limiter unit 5.

[Modifications]

The present invention is not limited to the preferred embodiment described above and a variety of changes or modifications can be made without departing from the scope of the present invention.

(a) In the preferred embodiment described above, the first side plate 51 and the flange plate 28 are taken out from a single plate; the second side plate 52 and the first input plate 21 are taken out from another single plate; the pressure plate 53 and the second input plate 22 are taken out from yet another single plate. However, the damper device 100 is not limited to have the configurations. Amongst three combinations of plates described above, only one combination of plates may be set as plates to be taken out from a single plate.

(b) In the preferred embodiment described above, the hub flange 23 is composed of two members: the hub 27 and the flange plate 28. However, the hub flange 23 may be provided as a single member.

(c) In the preferred embodiment described above, each coil spring is provided with the spring seats on both the ends thereof, respectively. However, each coil spring may not be provided with the spring seats. Alternatively, each coil spring may be provided with only one spring seat on one end thereof.

REFERENCE SIGNS LIST

2: Damper unit
21: First input plate
22: Second input plate
28: Flange plate
5: Torque limiter unit
51: First side plate
52: Second side plate
53: Pressure plate
100: Damper device

What is claimed is:

1. A damper device comprising:
a damper unit including an output plate, a first input plate, a second input plate unitarily rotated with the first input plate, and an elastic member elastically connecting the output plate and the first and second input plates; and
a torque limiter unit disposed radially outside the damper unit, wherein
the torque limiter unit includes
a first side plate having an annular shape,
a second side plate having an annular shape, the second side plate unitarily rotated with the first side plate, and
a pressure plate having an annular shape, the pressure plate having an inner diameter equal to an outer diameter of the second input plate, the pressure plate disposed axially between the first side plate and the second side plate, and
the pressure plate is disposed such that an inner peripheral surface thereof is not opposed to an outer peripheral surface of the second input plate.

2. A damper device comprising:
a hub flange unit including a flange;
a damper unit including an output plate, a first input plate, a second input plate unitarily rotated with the first input plate, and an elastic member elastically connecting the output plate and the first and second input plates, the output plate being the flange of the hub flange unit; and
a torque limiter unit disposed radially outside the damper unit,
wherein the torque limiter unit includes
a first side plate having an annular shape, the first side plate having an inner diameter equal to an outer diameter of the output plate, a second side plate having an annular shape, the second side plate unitarily rotated with the first side plate, and a pressure plate having an annular shape, the pressure plate disposed axially between the first side plate and the second side plate, the first side plate is disposed such that an inner peripheral surface thereof is not opposed to an outer peripheral surface of the output plate, and the output plate is equal in plate thickness to the first side plate.

3. A damper device comprising:

a damper unit including an output plate, a first input plate, a second input plate unitarily rotated with the first input plate, and an elastic member elastically connecting the output plate and the first and second input plates; and a torque limiter unit disposed radially outside the damper unit, wherein the torque limiter unit includes a first side plate having an annular shape, a second side plate having an annular shape, the second side plate having an inner diameter equal to an outer diameter of the first input plate, the second side plate unitarily rotated with the first side plate, and a pressure plate having an annular shape, the pressure plate disposed axially between the first side plate and the second side plate, the second side plate is disposed such that an inner peripheral surface thereof is not opposed to an outer peripheral surface of the first input plate, the first input plate is equal in plate thickness to the second side plate, and the plate thickness of the second side plate is less than the plate thickness of the first side plate.

4. A damper device comprising:

a damper unit including an output plate, a first input plate, a second input plate unitarily rotated with the first input plate, and an elastic member elastically connecting the output plate and the first and second input plates; and a torque limiter unit disposed radially outside the damper unit, wherein the torque limiter unit includes a first side plate having an annular shape, the first side plate having an inner diameter equal to an outer diameter of the output plate, a second side plate having an annular shape, the second side plate having an inner diameter equal to an outer diameter of the first input plate, the second side plate unitarily rotated with the first side plate, and a pressure plate having an annular shape, the pressure plate having an inner diameter equal to an outer diameter of the second input plate, the pressure plate disposed axially between the first side plate and the second side plate, the first side plate is disposed such that an inner peripheral surface thereof is not opposed to an outer peripheral surface of the output plate, the second side plate is disposed such that an inner peripheral surface thereof is not opposed to an outer peripheral surface of the first input plate, and the pressure plate is disposed such that an inner peripheral surface thereof is not opposed to an outer peripheral surface of the second input plate.

5. The damper device according to claim 4, wherein the inner diameter of the pressure plate is greater than the outer diameter of the output plate.

6. The damper device according to claim 5, wherein the inner peripheral surface of the pressure plate is opposed to the outer peripheral surface of the output plate.

7. The damper device according to claim 4, wherein the output plate is equal in plate thickness to the first side plate.

8. The damper device according to claim 4, wherein the first input plate is equal in plate thickness to the second side plate.

9. The damper device according to claim 4, wherein the second input plate is equal in plate thickness to the pressure plate.

\* \* \* \* \*